April 16, 1968 G. R. WORRELL ET AL 3,378,483
CONTROL OF CATALYST RECIRCULATION RATE
Filed Nov. 22, 1966
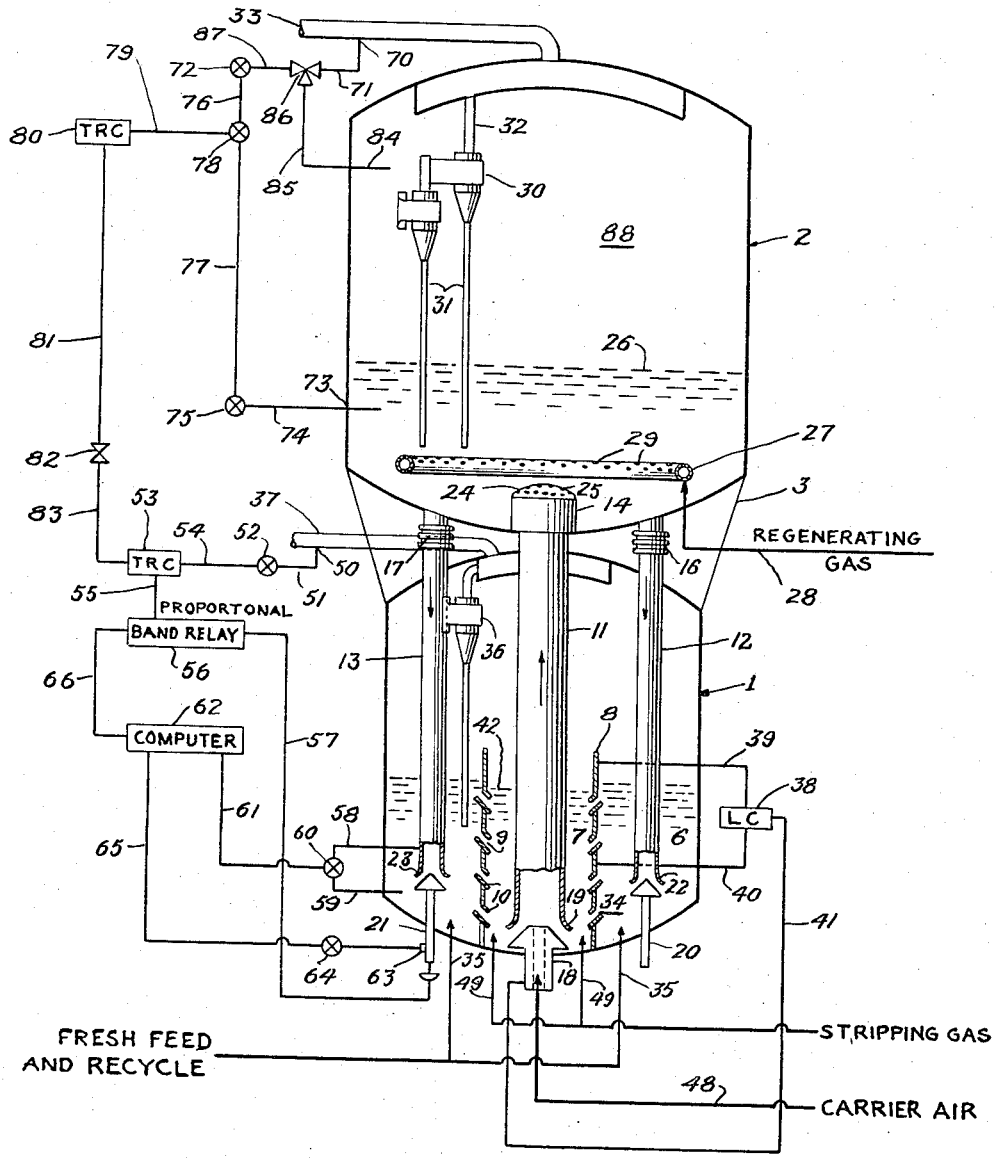
INVENTORS
GEORGE R. WORRELL
ROBERT C. HICKS
ROBERT J. DURNEY
BY Robert R. Cochran
ATTORNEY

United States Patent Office 3,378,483
Patented Apr. 16, 1968

3,378,483
CONTROL OF CATALYST RECIRCULATION RATE
George R. Worrell, Media, Robert C. Hicks, Drexel Hill, and Robert J. Durney, Philadelphia, Pa., assignors to Atlantic Richfield Company, Philadelphia, Pa., a corporation of Pennsylvania
Filed Nov. 22, 1966, Ser. No. 596,206
13 Claims. (Cl. 208—164)

ABSTRACT OF THE DISCLOSURE

A method of control of a process wherein fluids are transferred from a first zone to a second zone through a third zone wherein a control valve responsive to a temperature controller hereinafter defined is positioned within said third zone comprising measuring the temperature of said second zone, producing a first signal proportional to said temperature and directing said signal to a temperature controller having a proportional band adjusting means, measuring the pressure drop across said control valve, measuring the valve position, i.e., the position of the valve as related to the degree of opening from the full-open to the full-closed position, computing a proportional band setting for said temperature controller based upon said valve position and said pressure drop across said valve, producing a second signal proportional to said proportional band setting, and adjusting said proportional band adjusting means of said temperature controller in response to said second signal.

---

This invention relates to an improved method and apparatus for automatically controlling chemical processes. In a specific aspect, the invention is directed to an improved method and apparatus for automatically controlling processes wherein gases and vapors are contacted with finely divided catalytic material.

Although the method and apparatus of the present invention are applicable for use in a variety of processes, generally, chemical processes, such as for example, the synthesis of hydrocarbons by hydrogenation of carbon oxides; nitration of hydrocarbons, hydrocarbon conversion, e.g., desulfurization, hydrogenation, catalytic cracking, cracking under hydrogen pressure, dehydrogenation, etc., for convenience the process will be described herein as employed in fluid catalytic cracking units since the invention is particularly suited for such a process.

Fluid catalytic cracking has been known and commercially employed for many years. Although a number of useful and economic physical process variations have been made over the years (e.g., reactor-regenerator spatial relationships, internal and external cyclones, U-bends, and standpipes), the basic process has remained the same. In general, fresh feed (usually pre-heated) and if desired, at least one recycle stream are charged to a reactor inlet line where they pick up regenerated catalyst from a regenerated catalyst line or standpipe and are then passed into the reactor. Within, the reactor, the catlayst is maintained in a dense phase which, with respect to its physical properties, acts much like a liquid. All products are removed from the reactor in the vapor phase and pass to a product recovery section comprising a plurality of distillation columns for separation of the desired products. Portions of the catalyst in the reactor are continuously passed therefrom by the spent catalyst transfer line to a regenerator. Prior to passing the catalyst to the regenerator compartment, the catalyst, if desired, can be stripped of reaction products or incompletely converted reactant material. In the regenerator the coke is burned from the catalyst (likewise maintained in a dense bed) by contact with an oxygen containing gas. Flue gas is passed from the regenerator. The regenerated catalyst is then recirculated to the reactor.

In the operation of the method and apparatus of our invention, the conditions as to time, temperature, and pressure governing the conversion of hydrocarbonaceous material in the presence of finely divided solid catalytic material to lower boiling range products can be varied over a relatively wide range which depends, for the most part, upon the hydrocarbon feed material being treated and the extent of conversion desired. High-boiling hydrocarbon oils such as for example, gas oils, total and reduced crudes, vacuum distillates, solvent-decarbonized residual oils, etc., which can be catalytically cracked have an intial boiling point of about 400° F. to 600° F. and an end point of about 700° F. to about 1300° F. The API gravity of the high-boiling hydrocarbons ranges from about 10° to about 40°.

The high-boiling hydrocarbon oil can be cracked at a temperature of from about 850° F. to about 1000° F. and at a pressure of from about 1 atmosphere to about 100 p.s.i.g., more usually, from about 5 to about 50 p.s.i.g. The time of contact of the hydrocarbon feed with the catalyst depends upon the particular feed being treated, the refractivity of the hydrocarbon undergoing treatment, catalyst to oil ratio, and temperature. The catalyst to oil ratio (on a weight basis) can be maintained within the range from about 2 to about 25, more preferably, from about 5 to about 10.

The catalysts which can be employed are those which are capable of being regenerated; which substantially retain their solid subdivided state under the conditions to which they are exposed in the system; and those which are relatively easily handled in the cyclic apparatus hereinafter described. The catalysts are generally silica-base catalysts such as silica-alumia, silica-magnesia with or without additional promoters such as chromium, zirconium, boria, etc. The catalyst is employed in finely divided powdered form including a size range from about 0 to 200 microns in diameter, more usually, from 20 to about 150 microns in diameter.

As a result of the catalytic cracking of the high-boiling hydrocarbon oil, carbonaceous material is deposited on the catalyst. The catalyst is, therefore, subjected to a regeneration treatment at a temperature from about 700° F. to about 1300° F. The pressure of regeneration varies in the same range as the reaction pressure. The catalytic material is burned by means of an oxygen-containing gas, e.g., air, or a diluted air stream. Prior to the regeneration treatment, the catalyst may be subjected to stripping by means of a gasiform stripping agent. The stripping treatment serves to remove occluded volatile materials and to desorb such hydrocarbons contained in the catalyst. The stripping treatment is generally carried out at a temperature from about 800° F. to 1000° F. The gasiform stripping agent which can be used for this purpose is for example, steam, flue gas, carbon dioxide or normally gaseous hydrocarbons, e.g., methane, ethane, propane, etc.

The operation of the catalytic conversion process is a complex process and many process variables must be considered. Thus, for any given unit, the operator must know the effect of such major process variables as feed compositions (including recycle), feed temperature and rate, recycle rates, regenerating gas content and rate, system pressure, and catalyst activity and selectivity. Although some of these variables are directly measurable, some are not. As a result, the actual status of the system at any moment, or in what direction and amount the system is deviating from steady state operation is not actually known, largely because of the time lag involved for determining some of the quantities directly measured and for calculating those that cannot be directly measured. In short, there exists at this time no known method of operating a fluid contacting unit by a precise method. Although various process measuring instruments can feed data directly and automatically to a computer wherein the computer can carry out previously specified calculations; and adjustments in settings of process control instruments can be made for optimum performance of the unit, the operation nevertheless involves a great deal of operator skill and experience on each particular unit and is generally considered an art. Thus, a particular unit will vary from its optimum operation from day to day or from crew shift to shift. In addition, as the variety and sources and types of fuel stocks have increased with a concomitant deterioration in quality, refineries have become more complex and greater efficiency of operation has been required. In order to improve the operation of the process, we have invented a useful and novel control system, the objects of which are more fully hereinafter set forth.

It is therefore an object of this invention to provide an improved method for the control of a chemical process. Another object is to provide an improved method to automatically and continuously control the flow of a fluid from a first zone to a second zone. Yet another object is to provide an improved method for controlling the temperature of a fluid catalytic cracking unit by using a computer and a novel control system.

A further object is to provide an improved apparatus for controlling a chemical process, to provide an improved apparatus to automatically and continuously control the rate of flow of a fluid from a first chamber to a second chamber; and further to provide an improved apparatus for controlling the temperature of a fluid catalytic cracking unit by using a computer and a novel control system.

Other objects, advantages and features of our invention will be apparent to those skilled in the art without departing from the spirit and scope of the invention, and it should be understood that the latter is not necessarily limited to the accompanying discussion and drawing.

In one broad aspect the invention is directed to a method of control of a chemical process wherein fluids are transferred from a first zone to a second zone through a third zone wherein the rate of flow of said fluid is controlled by varying the effective cross-sectional flow area of said third zone, the improved method of control comprising measuring a property of at least one of said first and said second zones, producing a first signal proportional to said property comparing said first signal to a second signal representative of the desired property to obtain a third signal, measuring the pressure drop between said first zone and said second zone, producing a fourth signal proportional to said pressure drop, measuring the effective cross-sectional flow area of said third zone, producing a fifth signal proportional to said effective cross-sectional flow area, producing a sixth signal proportional to said fourth signal and said fifth signal, adjusting said third signal in response to said sixth signal to produce a seventh signal and adjusting the effective cross-sectional flow area of said third zone in response to said seventh signal.

In another broad aspect, the invention is directed to an apparatus comprising a first chamber means, a second chamber means, conduit means communicating between said first chamber means and said second chamber means, valve means positioned within said conduit means for controlling the flow of fluid through said conduit means, means to measure a property of a fluid in at least one of said first chamber and said second chamber, means to measure the pressure drop across said valve means, means to measure the position of said valve means, and control means communicating with said property measuring means, position measuring means and pressure drop measuring means for adjusting said valve in response to said valve pressure drop, valve position, and property measurement.

In order to more easily refer to the operation of a fluid catalytic cracking unit and the operating variables in combination therewith, reference is made to the accompanying schematic drawing, partly in section, showing a fluidized catalytic cracking reactor, stripper, and regenerator unit in combination with a computer control system.

It is to be understood that it is not essential in the method and means of this invention to position the regenerator above the reactor as specifically shown and described herein, since the method of this invention is applicable to other arrangements of apparatus employing fluidized catalyst beds. For example, the regenerator may be positioned by the side of the reactor or beneath the reactor.

Referring now to the drawing by way of example, a unitary apparatus is shown wherein a reaction vessel 1 supports a regeneration vessel 2 by means of an external structure 3.

The lower part of the reaction vessel 1 is divided into an annular reactor zone 6, and a centrally positioned cylindrical stripping zone 7, by means of a vertical cylinder or well 8 extending from the lower end portion of reaction vessel 1 up to about its mid-elevation. Stripping gas is introduced to the stripping zone 7 through a plurality of conduits 49. The two zones, 6 and 7, communicate with each other by means of horizontal slots 9 in the walls of cylinder 8. Slots 9 are disposed at more than one elevation so that the vessel can operate when filled with catalyst to various depths, however, slots 9 are located near the bottom of the zones 6 and 7 so that they are almost always substantially below the upper surface of the catalyst beds contained therein. The slots 9 are shielded by means of louver baffles 10 which extend obliquely downwards (in the direction of flow) from reactor zone 6 to stripping zone 7, and extend along the lower edge of slots 9 to shield them from upflowing vapors and to prevent crossover of gases between the two zones. At maximum level, some catalyst will flow from zone 6 into zone 7 by way of overflow over the upper edge of cylinder 8.

Circulation of catalyst between regeneration vessel 2 and reaction vessel 1 is accomplished by means of a cylindrical upflow conduit 11 and a pair of downflow conduits 12 and 13. It being understood, of course, that more than one upflow conduit, and one or more than two downflow conduits can be provided for contacting the same, or a different portion of the reactant material therein. In the apparatus shown, conduits 12 and 13 are arranged symmetrically with respect to conduit 11, and each of said conduits 12 and 13 is spaced equidistantly from well 8 and the vertical side of reaction vessel 1. Conduit 11 opens at its lower end in the lower part of stripping zone 7; at its upper end it enters the bottom of regeneration vessel 2 and opens into the interior of a relatively small distributor vessel 14.

The flow of material into the upflow conduit 11 from the stripping zone 7 is dependent upon the size of the opening between the vertically reciprocal motor valve 18 and its seat 19. Arrangement of the downflow conduits 12 and 13 with their expansion joints 16 and 17, their vertically reciprocal motor valves 20 and 21, and their valve seats 22 and 23 is similar to that of the upflow conduit. The movement of the vertically reciprocal motor valves relative to the valve seats 19, 22 and 23 respectively can be accomplished through the use of pneumatic, hydraulic, electric or other motor control means or combinations thereof.

Conduits 12 and 13 extend from the lower end of regeneration vessel 2. Their intake is from the bottom of regeneration vessel 2 in an annular space external to distributor vessel 14. Their outlets are near the lower end portion of reactor zone 6, somewhat above the inlet of upflow conduit 11, but sufficiently low so as to discharge regenerated catalyst into reaction zone 6 at a point sufficiently low to avoid immediate flow of fresh regenerated catalyst into stripping zone 7 by way of the louvered slots 9.

Upflow through conduit 11 and downflow through conduits 12 and 13 can be controlled by plug valves which seat against annular seats on the lower end of the respective conduits, although other types of valves can be utilized, e.g., slide valves. Vertically reciprocable valve 18 is centrally positioned and seats against annular valve seat 19 in the lower end of upflow conduit 11, while valves 20 and 21, similarly reciprocable in the bottom of reaction vessel 1, seat against valve seats 22 and 23 in the lower ends of downflow conduits 12 and 13 respectively. Distributor vessel 14 is a centrally located, vertical cylinder and is closed at its lower end by the bottom of regenerator vessel 2 and having at its upper end a convex surface 24 which is provided with numerous relatively small openings 25. Distributor vessel 14 serves to discharge spent catalyst entrained in regenerating gases upwardly into a mass of catalyst undergoing regeneration. Such a mass is indicated by the numeral 26. Distributor vessel 14 discharges the spent catalyst and regenerating gas, usually air introduced through conduit means 48 and valve 18 into catalyst mass 26 (contained within the lower end portion of regeneration vessel 2) at a point somewhat above the bottom thereof, so that regenerated catalyst being withdrawn from the bottom of catalyst mass 26 is less likely to entrain undesirable amounts of oxygen or other regenerating gas constituents. Additional regenerating gas is introduced into the lower part of catalyst mass 26 by means of a distributor ring 27. Regenerating gas introduced into the interior of distributor ring 27 by way of pipe 28 escapes into catalyst mass 26 by means of numerous small holes 29 in the upper surfaces of distributor ring 27.

Flue gases rise from the upper surfaces of catalyst mass 26 entraining considerable amounts of the powdered catalyst undergoing regeneration. Most of this entrained catalyst settles out of the rising flue gases as they pass upwardly through the settling space 88 (upper end portion of regeneration vessel 2) above the catalyst mass 26 within regeneration vessel 2. The flue gases then pass through a cyclone separating system 30, returning additional entrained catalyst to catalyst mass 26 by way of diplegs 31. The flue gases then pass out of regeneration vessel 2 by way of line 32 and stack 33, which extends upwardly from regeneration vessel 2 to a distance which is safely above adjacent operating equipment.

Regenerated catalyst leaves the bottom of catalyst mass 26 through downflow conduits 12 and 13 and enters a reaction mass 34 of annular shape in the lower part of reaction vessel 1. Hydrocarbons to be converted are introduced (usually in liquid form) through a substantial number of jet nozzles 35 in the bottom of reaction vessel 1. The hydrocarbons vaporize almost instantly as they enter the bed of hot catalyst 34 and undergo conversion as they pass upwardly through the mass of catalyst. The converted vapors rise from the upper surface of catalyst mass 34, lose some entrained catalyst by settling in the space above mass 34 within reaction vessel 1, lose further entrained catalyst by passage through a cyclone separating system 36, and then pass out of reaction vessel 2 by way of conduit 37, which carries the reaction product vapors to further treatment facilities, for example, to a fractional distillation tower in which the various conversion products are separated.

Control instrumentation means are associated with the reactor, stripping and regeneration zones to maintain appropriate dense phase bed level in such zones, and the catalyst circulation rate between such zones. Reactor holdup is controlled by varying the stripper level. The level in the reactor bed when catalyst is being circulated is equal to the level in the stripper plus the head necessary to cause the catalyst to flow through the stripper feed slots.

At the reaction vesel 1 a level controller means 38 with level indicating taps 39 and 40 is connected with the side wall 8 of the stripping zone 7. A control line 41 from the level controller means 38 connects with the valve 18 in the up-flow standpipe 11 and provides means for maintaining a desired dense phase stripper bed level 42. Generally, the valve control means such as used in connection with valve 18 are operated such that the level controller means 38 may be of any conventional type suitable to regulate a pneumatic motor control means of the valve 18, although electrical control, hydraulic control or other motor control means or combinations thereof can be used. The spent catalyst valve 18 thus provides direct control of the level of the catalyst bed in the reactor-stripper section.

According to our invention, the rate of catalyst circulation through the system is controlled by the regenerated catalyst valves 20 and 21 and is regulated in a novel manner to transfer to the reactor zone 6 the amount of hot catalyst necessary to maintain the desired reaction temperature. There is preferably located in the vapor outlet section of the reaction vessel 1 a temperature sensing means 50. It will be appreciated, however, that the sensing means 50 can be positioned, if desired, within the reaction vessel 1, either in the upper end portion or lower end portion thereof. The temperature sensing means 50 is connected through a sensing line 51 to a temperature transmitter 52, which connects through control line 54 to a temperature recorder controller 53 which in turn connects through control line 55 to a proportional band relay 56, which in turn connects through control line 57 with an air piston or other motor means provided for the regulation of the valve 21 in the regenerated catalyst downflow standpipe 13. A first pressure sensing device 58 is located near the base of the regenerated catalyst downflow standpipe 13, and a second presure sensing device 59 is positioned below the valve seat 23, and adjacent to the valve 21. The two pressure sensing devices are connected to a differential pressure transmitter 60, which in turn is connected through means of a control line 61 to a computer 62. The output signal of the differential pressure transmitter 60 is proportional to the pressure drop across the valve 21. There is further located on the motor valve 21 a position-indicating device 63 which is capable of indicating the position of the valve, i.e., the position of the valve as related to the degree of opening from the full open to the full closed position. This position indicator 63 connects to the computer 62 through transmitter 64 and control line 65. The output of the computer connects through means of a control line 66 to the proportional band relay 56, which in turn, as previously indicated, is connected to the valve 21 through means of the control line 57 in order to manipulate the position of valve 21. The output control signal from the proportional band relay thus regulates the valve 21 that admits regenerated catalyst into the reaction vessel 1. The catalyst circulation rate in the system is thus readily varied and is responsive to the controller 53, the position of the valve 21, and the differential pressure 64 across the valve 21. The control system thus provided results in the proportional band of the temperature controller being a direct function of valve gain and there results an adaptive controller which adjusts to changes in valve position and pressure drop across the valve.

As utilized herein, the proportional band of the controller is the full range of values of the controlled variable (reaction temperature) through which there is proportional action wherein the proportional control action is such that the controller moves the final control element (valve means) to a definite position for each value of the controlled variable and wherein the smaller the proportional band the larger the change in valve position for any given change in the controlled variable, i.e., the change in valve position is inversely proportional to a change in the proportional band. Adaptive control is a control scheme wherein variations in plant dynamics are sensed by an adaptive device and wherein the adaptive device is able to adjust a controller parameter of function.

It should be understood that in the particular embodiment hereinabove described approximately one-half of the catalyst flow passes through conduit 12, whereas the remaining catalyst passes through conduit 13. The flow through conduit 13 thus varies in response to the temperature controller 53, the pressure drop across the valve, and the valve position. It is obvious, of course, that various adjustments can be made in the position of valve 20 either manually or through pneumatic, hydraulic, electric or other means or combinations thereof to permit a greater or lesser amount of catalyst to flow through conduit 12.

It should be further understood and apparent to those skilled in the art that the proportional band relay 56 can be a separate control instrument which produces a result equivalent to the changing of the proportional band of the temperature controller 53. In the alternative, it can be built into the temperature controller 53, such that the temperature controller 53 and proportional band relay 56 are but a single instrument. It will also be appreciated that other means can be utilized in place of the proportional band relay 56 in order to produce the result hereinabove set forth.

The following specific embodiment is presented to show the operation of the computer 62 for a particular plug type motor control valve, it being understood, of course, that the equations and the computer are specific to a particular plug type motor control valve and that the equations and computer operation can be readily modified where motor valves other than plug type motor valves are utilized, for example, it will be apparent to those skilled in the art that the relationship of catalyst flow as a function of valve position and pressure drop across the valve, for a slide valve, would be different from that of a plug valve.

For a specific plug type motor control valve wherein catalyst flow is proportional to the square root of the pressure drop across the valve and wherein (1) $\qquad A = 35 S^{0.8}$ where A is the effective area for catalyst flow in square inches
and S is the inches of valve travel from the full closed position.

The flow of catalyst through the valve in tons/hour is represented by the following equation (2) $\qquad F = k S^{0.8} P^{0.5}$ where F is regenerated catalyst flow through the valve in tons/hour
S is inches of valve travel from the full closed position
P is pressure drop across the valve in p.s.i.
and k is a constant.

Taking the partial derivative with P constant to obtain the valve gain there results (3) $\qquad \left(\frac{\partial F}{\partial S}\right) = 0.8 k S^{-0.2} P^{0.5} = $ valve gain $$P = \text{const.}$$

If the proportional band of the controller is made a direct function of valve gain, there is obtained an adaptive controller which adjusts to changes in valve position and valve pressure drop.

Therefore, the equation can be written (4) $\qquad \dfrac{a P^{0.5}}{S^{0.2}} = \dfrac{a P^b}{S^c} = \text{P.B.} = $ proportional band where $a$, $b$ and $c$ are constants.

In order to permit flexibility of operation, $b$ can cover the range from about 0.1 to about 1.0 and $c$ a range from about 0.1 to 1.0, P being limited to a minimum of 1. If the equations are solved by the computer 62 which can take logarithms, there results the equation (5) $\qquad$ Log (P.B.) = log $a$ + $b$ log P − $c$ log S Log $a$ can be replaced by constant $d$, therefore (6) $\qquad$ Log (P.B.) = $d$ + $b$ log P − $c$ log S where all logs are logarithms to the base 10

$d$ is a constant
P is the pressure drop across the valve in p.s.i.
S is inches of valve travel from the full closed position
and P.B. is the proportional band output signal from the computer in percent.

For example, if the proportional band of the temperature controller is 10 percent and the computer output P.B. is 80 percent, the corrected proportional band setting for the temperature controller would be $$10\% \times \frac{80\%}{100} = 8\%$$

In one run, in order to determine the constant $d$, the proportional band of controller 53 was set at 7.1 percent. With this particular proportional band setting the valve position indicator read 6 inches from the full closed position and the pressure drop across the valve was 4 p.s.i. When upsets in the system occurred with this particular proportional band setting there resulted a situation wherein an excessive amount of time was required for the temperature of the reactor to return to the set point. In order to correct this situation through the method and apparatus of our invention, it was first necessary to determine a new proportional band setting for the controller. It is known to those skilled in the art that the proportional band setting of a controller can be determined by the well-known method of Ziegler and Nichols. According to their method, the proportional band setting can be determined in the field by placing the controller on proportional response and adjusting the proportional band setting until continuous cycling occurs. The optimum proportional band setting is then equal to approximately 2.2 times the setting which results in continuous cycling. In following this procedure, we determined that the proportional band setting wherein the valve position averages 6 inches from the full closed position and wherein the pressured drop across the valve is 4 p.s.i., should be 5.7 percent. Therefore, in order to use the method and apparatus of our invention, it is necessary that the computer calculate a proportional band setting for the controller based upon valve position and the pressured drop across the valve so that proportional band setting of the temperature controller can be automatically varied. As such, the proportional band (P.B.) for this example was determined to be $$(100)\left(\frac{5.7}{7.1}\right) = 80\%$$

The required value of $d$ can then be calculated from the design equation (7) $\qquad$ Log (P.B.) = $d$ + $b$ log P − $c$ log S therefore (8) $\qquad$ Log 80 = $d$ + 0.5 log 4 − 0.2 log 6 and solving for $d$, there results (9) $\qquad$ 1.903 = $d$ + (0.5)(0.602) − (0.2)(0.778)

(10) $\qquad\qquad d = 1.76$

In order to permit flexibility of operation, $d$ can cover the range from about 0.00 to about 2.50 or from about 1.00 to 2.50.

According to our invention, once the constants $b$, $c$ and $d$ are determined and fed to the computer, the computer will determine, based upon the valve position and pressure drop, the most effective proportional band setting for the temperature controller. There results, therefore, an adaptive controller which automatically and continuously adjusts the proportional band of said temperature controller. It should be understood, of course, that in certain instances dependent upon valve characteristics, the computer can compute a proportional band based upon a valve pressure drop only.

As hereinabove indicated, the equations set forth are specific to a particular plug type motor control valve. It should be kept in mind that equations can be developed for other type valves wherein a relationship pertaining to flow as a function of pressure drop and valve position can be determined, and that our invention is not directed to the use of a particular valve or to a particular equation, but to the combination of a temperature controller with a computer wherein the computer determines the proper proportional band setting of the temperature controller.

It is apparent that if the characteristics of the valve are such that the rate of flow through the valve is represented by the following equation:

$$F = k S_1 P_{0.5}$$

there results in taking the partial derivatives with P constant to obtain the valve gain:

$$\left(\frac{\partial F}{\partial S}\right) P = \text{constant} = k P^{0.5} = \text{valve gain}$$

The equation can be written:

$$k P_{0.5} = k P^b = \text{proportional band}$$

where $k$ and $b$ are constants. It can be seen therefore, that the proportional band in this embodiment is merely a function of the pressure drop across the valve and not valve position. Therefore, the input to the computer would merely be the pressure drop across the valve without the additional input of valve position.

The use of the method and apparatus of our invention results in a control system which provides more accurate control of a fluidized bed contacting unit and which, following an upset in the system, returns the reaction temperature to its proper value in a time substantially shorter than that previously obtained with the use of a conventional controller in the absence of our novel method and apparatus.

According to another specific embodiment of our invention it is preferred to locate on the regenerator outlet line 33 a first temperature sensing means 70 connected through a sensing line 71 to a three-way valve or switch means 86 which is thence connected through a sensing line 87 to a temperature transmitter 72. There is located in the regenerator settling space 88 a second temperature sensing means 84 connected through a sensing line 85 to the three-way valve or switch means 86 which, as indicated, is connected by means of sensing line 87 to the temperature transmitter 72. A third temperature sensing means 73 is located in the regenerator dense phase 26 and is connected by means of sensing line 74 to a temperature transmitter 75. The output signals of the transmitters 72 and 75 are thence connected through means of control lines 76 and 77 respectively to a differential temperature transmitter 78 which in turn is connected through means of a control line 79 to a temperature recorder controller 80. The output signal of the controller 80 is thence connected to the temperature controller 53 through means of control line 81, a valve or switch means 82, and control line 83. The output signal of the controller 80 adjusts the set point (the desired value of temperature) of the temperature controller 53. There results, therefore, a cascade control system which takes into consideration the regenerator differential temperature.

The use of the valve or switch means 82 permits the operation of system with or without the addition of the control feature hereinabove described. Therefore, if it is desired to operate the system without taking into consideration the differential temperature measurement as described, control line 81 is merely disconnected from control line 83 through means of the valve of switch means 82.

With reference to the three-way valve or switch means 86, it will be apparent to those skilled in the art that the signal directed to transmitter 72 will depend upon the operation of the valve or switch means 86. For example, if it is desired to measure the temperature in the outlet line 33, the valve or switch means would be operated such that sensing means 70 would produce a signal which would be directed to the temperature transmitter 72. In the alternative method of operation, a signal can be directed from sensing means 84 directly to the temperature transmitter 72. It is therefore apparent that either the temperature in the vapor outlet line 33 or in the regenerator settling space 88 can be used for a temperature measurement which is compared to the temperature existing in the regenerator dense phase.

In the operation of the method and apparatus of our invention, it is preferred that two mode temperature controllers be utilized, i.e., controllers having proportional plus reset action. However, it will be obvious to those skilled in the art that various modifications can be made such that single mode controllers, i.e., those having proportional action only, or three mode controllers, i.e., those having proportional plus reset plus rate action, can be utilized.

The measurement and control equipment described are conventional and are available from many automatic controller manufacturers utilizing pneumatic or electronic energy or combinations of the two as the analog of the measurement and control signals. Likewise, equipment capable of performing the calculations given above is available in either pneumatic or electronic form, as desired, from several manufacturers. In most instances, complex automatic control and computer systems will use both pneumatic and electronic instrumentation, computation, and control components to the best advantage. Measurement inputs and computing networks must be compatible in their analogies, therefore in some cases transducers from pneumatic to electrical signals, or vice versa, would be required to achieve operability and mathematical consistency.

Although the control system of this invention has been described with particular reference to a fluid catalytic cracking unit, it will be understood by those skilled in the art that the invention is applicable to any system involving two or more contact chambers with transfer of materials between said chambers wherein a generally similar relationship exists. It will be further understood that various modifications and alterations of this invention will become apparent and can be made by those skilled in the art without departing from the spirit and scope thereof, and that the specific details hereinabove set forth are purely illustrative.

Having thus described our invention, it should be understood that no undue limitations or restrictions are to be imposed by reason thereof.

We claim:

1. In a method of control of a process wherein fluids are transferred from a first zone to a second zone through a third zone wherein the rate of flow of said fluid is controlled by varying the effective cross-sectional flow area of said third zone, the improved method of control comprising measuring a property of at least one of said first and said second zones, producing a first signal proportional to said property, comparing said first signal to a second signal representative of the desired property to obtain a third signal, measuring the pressure drop between said first zone and said second zone, producing a fourth signal proportional to said pressure drop, computing a fifth signal proportional to said fourth signal, adjusting said third signal in response to said fifth signal to produce a sixth signal and adjusting the effective cross-sectional flow area of said third zone in response to said sixth signal, whereby the changes in effective cross-sectional flow area are inversely proportional to said fifth signal.

2. In a method of control of a process wherein fluids are transferred from a first zone to a second zone through a third zone wherein the rate of flow of said fluid is controlled by varying the effective cross-sectional flow area of said third zone, the improved method of control comprising measuring a property of at least one of said first and said second zones, producing a first signal proportional to said property, comparing said first signal to a second signal representative of the desired property to obtain a third signal, measuring the pressure drop between said first zone and said second zone, producing a fourth signal proportional to said pressure drop, measuring the effective cross-sectional flow area of said third zone, producing a fifth signal proportional to said effective cross-sectional flow area, producing a sixth signal proportional to said fourth signal and said fifth signal, adjusting said third signal in response to said sixth signal to produce a seventh signal and adjusting the effective cross-sectional flow area of said third zone in response to said seventh signal.

3. The process according to claim 2 wherein the property measured is the temperature.

4. The process according to claim 2 wherein said chemical process is a fluidized bed catalytic cracking process.

5. A method of automatically controlling a continuous process for the catalytic cracking of a feed stream comprising contacting said feed stream with a dense fluidized bed of a catalytic material in a reaction zone to produce a reaction product wherein the catalyst is contaminated as a result of said reaction, withdrawing products of reaction from said reaction zone, withdrawing contaminated catalyst from said reaction zone, passing said withdrawn catalyst through a stripping zone and contacting said catalyst with a stripping gas, withdrawing stripped catalyst from said stripping zone and passing the same with gaseous material as a combined stream through a first confined zone into a catalyst regeneration zone, contacting said contaminated catalyst in said regeneration zone with additional gaseous material whereby contaminants are removed from said catalyst by burning, withdrawing regenerated catalyst from said regeneration zone and passing said withdrawn regenerated catalyst through a second confined zone to said reaction zone; the improvement comprising regulating the flow of solids through said second confined zone by varying the effective cross-sectional flow area of said second confined zone whereby said effective cross-sectional flow area is regulated directly responsive to the temperature of said reaction zone, the pressure drop across said second confined zone, and said effective cross-sectional flow area.

6. The process according to claim 5 wherein the temperature in the reaction zone is measured providing a first signal proportional to said temperature, comparing said first signal to a second signal representative of the desired temperature in said reaction zone to obtain a third signal, the magnitude of which is related to the difference between said first and said second signal, measuring the effective cross-sectional flow area of said second zone, producing a fourth signal proportional to said effective cross-sectional flow area, measuring the pressure drop across said second confined zone, producing a fifth signal proportional to said pressure drop, producing a sixth signal proportional to said pressure drop and said effective cross-sectional flow area, adjusting said third signal in response to said sixth signal to produce a seventh signal and adjusting said effective cross-sectional flow area in response to said seventh signal.

7. The process according to claim 6 wherein said regeneration zone comprises an upper zone and a lower zone and a vapor outlet zone, measuring a first temperature in said lower zone, producing an eighth signal proportional to said first temperature, measuring a second temperature in at least one of said upper zone and said vapor outlet zone, producing a ninth signal proportional to said second temperature, comparing said eighth signal with said ninth signal to produce a tenth signal proportional to the difference between said eighth signal and said ninth signal, comparing said tenth signal to an eleventh signal representative of the desired temperature differential to obtain a twelfth signal, the magnitude of which is proportional to said tenth signal and said eleventh signal, and adjusting said second signal in response to said twelfth signal.

8. An apparatus comprising a first chamber means, a second chamber means, conduit means communicating between said first chamber means and said second chamber means, valve means positioned within said conduit means for controlling the flow of fluid through said conduit means, means to measure a property of a fluid in at least one of said first chamber and said second chamber, means for producing a first signal proportional to said property measurement, means for directing said first signal to a property controller means having a proportional band adjusting means, means to measure the pressure drop across said valve means, computer means communicating with said pressure drop measuring means and adapted to compute a proportional band setting for said property controller means, means communicating with said computer means and said property controller means and adapted to adjust the proportional band setting of said property controller means whereby said property controller means produces a control signal and whereby said control signal is directed to means for adjusting said valve means in said conduit means in order to control the fluid flow rate through said conduit means.

9. An apparatus comprising a first chamber means, a second chamber means, conduit means communicating between said first chamber means and said second chamber means, valve means positioned within said conduit means for controlling the flow of fluid through said conduit means, means to measure a property of a fluid in at least one of said first chamber and said second chamber, means to measure the pressure drop across said valve means, means to measure the position of said valve means, and control means communicating with said property measuring means, position measuring means and pressure drop measuring means for adjusting said valve in response to said valve pressure drop, valve position, and property measurement.

10. An apparatus according to claim 9 wherein the property measuring means are temperature measuring means.

11. A fluid catalytic cracking apparatus comprising a reaction chamber, a catalyst regeneration chamber having an upper end portion and lower end portion, first conduit means communicating between said regeneration chamber and said reaction chamber for conducting hot regenerated catalyst into the latter, valve means in said first conduit means, second conduit means for feeding hydrocarbon material to said reaction chamber, third conduit means communicating between said reaction chamber and said regeneration chamber for conducting spent catalyst to the latter, fourth conduit means for feeding stripping gas to said reaction chamber, fifth conduit means for feeding air to said reaction chamber and said regeneration chamber, sixth conduit means communicating with the upper portion of said reaction chamber for conducting reaction products to recovery, seventh conduit means communicating with the upper portion of said regenerator for conducting flue gas to vent, means to measure a first temperature representative of the temperature in said reaction chamber, means for producing a first signal proportional to said temperature measurement, and means for directing said first signal to a first temperature controller means having a set point adjusting means and a proportional band adjusting means, means for measuring the pressure drop across said valve located in said first conduit means, means for measuring the position of said valve, computer means communicating with said pressure drop measuring means and said valve position measuring means adapted to compute a proportional band setting for said first temperature controller means, means communicating with said computer means and temperature controller means and adapted to adjust the proportional band setting of said first temperature controller means, whereby said first temperature controller means produces a second signal and whereby said second signal is directed to means for adjusting said valve means in said first conduit in order to control the catalyst flow rate through said first conduit and thereby the temperature of the reaction product vapors.

12. An apparatus according to claim 11 further comprising means to measure a second temperature in said lower zone of said regeneration chamber, means to measure a third temperature in at least one of said upper zone and said seventh conduit means, means to determine the difference in temperature between said second temperature measurement and said third temperature measurement, means to produce a signal proportional to said difference, means to direct said difference signal to a second temperature controller means whereby said second temperature controller means produces a control signal, whereby said control signal is directed through means to adjust said set point of said first temperature controller means.

13. The process according to claim 1 wherein the property measured is temperature.

References Cited

UNITED STATES PATENTS

| | | | |
|---|---|---|---|
| 2,905,635 | 9/1959 | Harper | 208—164 |
| 2,970,473 | 2/1961 | Kendig | 137—487.5 |
| 3,271,472 | 9/1966 | Ogle et al. | 260—683 |
| 2,601,676 | 6/1952 | Trainer et al. | 23—1 |
| 2,643,216 | 6/1953 | Findlay | 208—48 |
| 2,699,988 | 1/1955 | McGrath et al. | 23—288.3 |
| 2,726,197 | 12/1955 | Ewell | 23—288.3 |
| 2,763,597 | 9/1956 | Martin et al. | 23—288.3 |
| 2,965,454 | 12/1960 | Harper | 208—164 |
| 3,128,129 | 4/1964 | Stine et al. | 23—288.3 |
| 3,152,064 | 10/1964 | Osborne | 208—164 |
| 3,175,968 | 3/1965 | Berger | 208—164 |

HERBERT LEVINE, *Primary Examiner.*

PAUL M. COUGHLAN, JR., *Examiner.*